(12) United States Patent
Robinson et al.

(10) Patent No.: US 7,168,051 B2
(45) Date of Patent: Jan. 23, 2007

(54) SYSTEM AND METHOD TO CONFIGURE AND PROVIDE A NETWORK-ENABLED THREE-DIMENSIONAL COMPUTING ENVIRONMENT

(75) Inventors: Jack D. Robinson, San Francisco, CA (US); Linda R. James, Castro Valley, CA (US); Thomas Alonzo Cardaci, II, San Francisco, CA (US); Kristin Blandford, San Francisco, CA (US)

(73) Assignee: Addnclick, Inc., Vacaville, CA (US)

( * ) Notice: Subject to any disclaimer, the term of this patent is extended or adjusted under 35 U.S.C. 154(b) by 172 days.

(21) Appl. No.: 09/745,257

(22) Filed: Dec. 20, 2000

(65) Prior Publication Data

US 2002/0113820 A1 Aug. 22, 2002

Related U.S. Application Data

(63) Continuation-in-part of application No. 09/686,206, filed on Oct. 10, 2000.

(51) Int. Cl.
*G06F 15/00* (2006.01)
(52) U.S. Cl. ...................... 715/848; 715/746
(58) Field of Classification Search ........ 345/848–852,
345/748–749, 760, 757, 836, 419, 427, 423,
345/652, 663, 678, 6; 715/848–852, 757,
715/836, 748–749, 760, 746, 762–763, 772
See application file for complete search history.

(56) References Cited

U.S. PATENT DOCUMENTS

| | | | |
|---|---|---|---|
| 5,148,154 A | 9/1992 | MacKay et al. | |
| 5,276,785 A | 1/1994 | Mackinlay et al. | |
| 5,388,197 A | 2/1995 | Rayner | |
| 5,452,414 A | 9/1995 | Rosendahl et al. | |
| 5,555,354 A | 9/1996 | Strasnick et al. | |
| 5,802,219 A | 9/1998 | Farkas et al. | |
| 5,826,270 A | 10/1998 | Rutkowski et al. | |
| 5,835,712 A | 11/1998 | DuFresne | |
| 5,973,694 A | 10/1999 | Steele et al. | |
| 6,008,814 A * | 12/1999 | Baldwin et al. | 345/427 |
| 6,043,818 A | 3/2000 | Nakano et al. | |
| 6,072,483 A * | 6/2000 | Rosin et al. | 345/349 |
| 6,088,032 A | 7/2000 | Mackinlay | |
| 6,229,546 B1* | 5/2001 | Lancaster | 345/419 |
| 6,313,855 B1* | 11/2001 | Shuping et al. | 345/854 |
| 2001/0043237 A1* | 11/2001 | Schmieder | 345/839 |
| 2002/0033849 A1* | 3/2002 | Loppini et al. | 345/848 |
| 2002/0154214 A1* | 10/2002 | Scallie et al. | 348/51 |
| 2004/0100480 A1* | 5/2004 | Lupu | 345/700 |

OTHER PUBLICATIONS

Search Report for PCT/US01/42578; mailed Mar. 22, 2002; 1 page.
Search Report for PCT/US01/42579 mailed Dec. 31, 2001, 1 page.

* cited by examiner

*Primary Examiner*—Steven Sax
(74) *Attorney, Agent, or Firm*—Blakely, Sokoloff, Taylor & Zafman, LLP

(57) ABSTRACT

A computer network-based system and method to configure and provide network-enabled three-dimensional computing environments is disclosed.

20 Claims, 9 Drawing Sheets

SYSTEM AND METHOD TO CONFIGURE AND PROVIDE A NETWORK-ENABLED THREE-DIMENSIONAL COMPUTING ENVIRONMENT

PRIORITY CLAIM

This is a continuation-in-part patent application claiming priority to parent U.S. application Ser. No. 09/686,206, filed Oct. 10, 2000.

FIELD OF THE INVENTION

The field of the invention relates to computer interfaces, networking, e-commerce, and configurable websites. More particularly, the field of the invention relates to an improved system and method to configure and provide network-enabled three-dimensional computing environments.

BACKGROUND OF THE INVENTION

The computer networks such as the Internet and particularly the World Wide Web (WWW) have developed into a convenient medium by which businesses and consumers alike can sell and purchase goods and services. To facilitate such commercial activity or "electronic commerce", businesses provide virtual or electronic environments or stores online utilizing web, application and file servers which a customer can then access using a web browser client application. Today, customers can purchase a wide variety of products by interacting with online environments via such web browsers.

"Being in" a computing environment is more intuitive and user-friendly than merely "looking into" it. It is far more intuitive, easier and "brain friendly" to comprehend large amounts of data in the form of "visual objects", particularly three-dimensional (3D) objects.

In the beginning, users interfaced with their computers via one-dimensional (1D) strings of text code, a slow and difficult process that only a few people could master. Next, Graphical User Interfaces (GUIs) enabled users to address computers with 2D icons representing those strings of code, a dramatic simplification and step forward. However, the 2D space can stifle accessibility to functionality in a computing or e-commerce environment.

Accordingly, there is a need for an improved system and method to configure and provide network-enabled three-dimensional computing environments.

SUMMARY OF THE INVENTION

The present invention is a system and method to configure and provide network-enabled three-dimensional computing environments. The presently disclosed technology enables users to interact fully, intuitively and far more easily "in" a spatial 3D environment. This technology enables each user to create an intuitive 3D desktop environment tailored to their specific needs. When turned on, the user's computer screen displays a 3D room or scene, which can be customized with virtual objects. The user can "enter" the space, rather than merely "view it", operate intuitively within it (360° in every direction), and invite others to enter, participate and interact in that space. This novel technology offers an enjoyable, interactive environment as a welcome alternative to the current predominantly 2D, text-based Internet experience.

BRIEF DESCRIPTION OF THE DRAWINGS

The present invention is illustrated by way of example and not limitation in the figures of the accompanying drawings, in which

FIG. 2b illustrates a prior art architecture of the data processing system depicted in FIG. 2a.

DETAILED DESCRIPTION OF THE PREFERRED EMBODIMENT

A computer network-based system and method to configure and provide network-enabled three-dimensional computing environments is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 1:
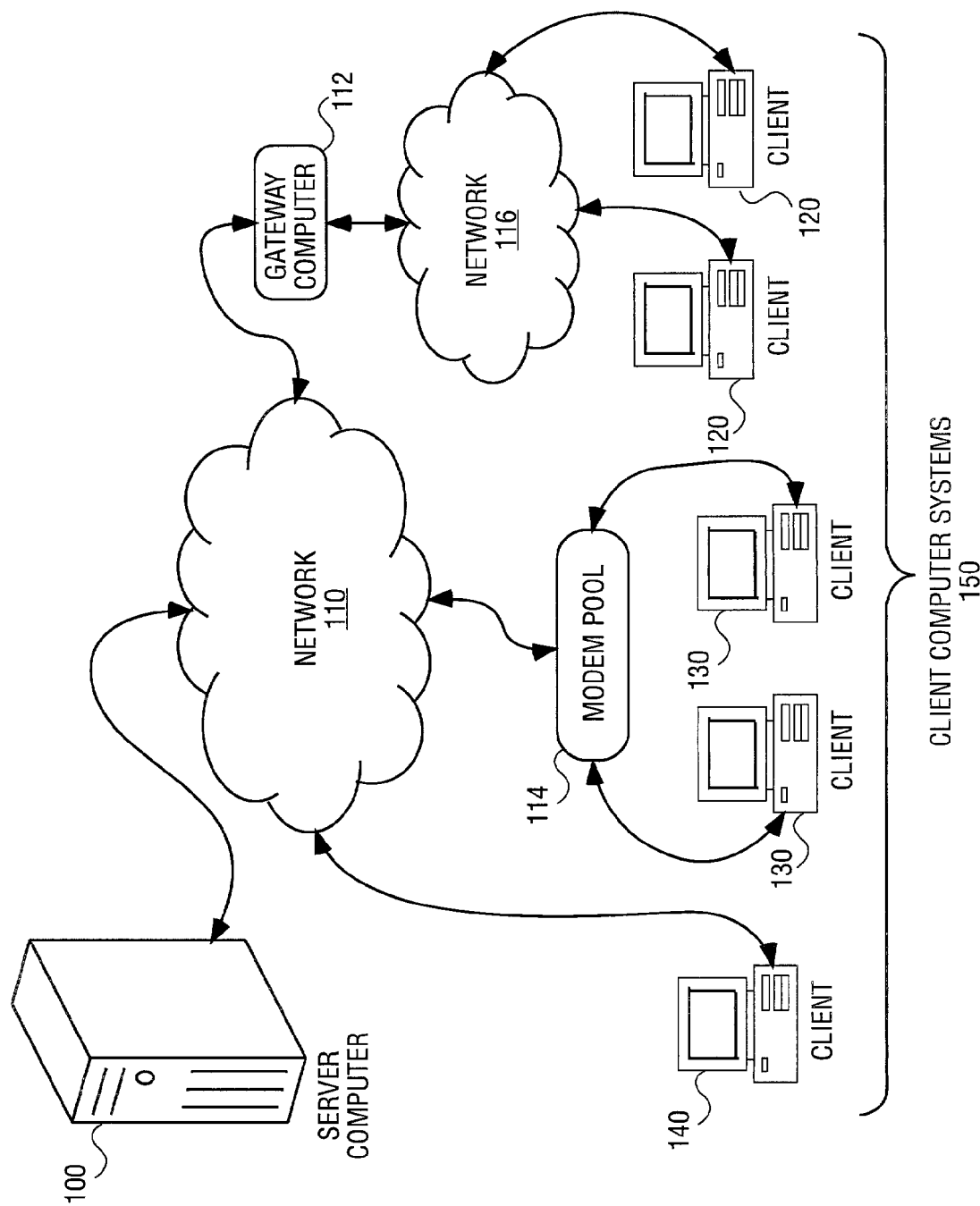
FIG. 1 illustrates a conventional communications network topology in which the present invention may be implemented.

Referring now to FIG. 1, a diagram illustrates various network topologies to which the present invention may be applied. In conventional network architectures, a server computer system 100 is coupled to a network 110. Using conventional network protocols, server 100 may communicate through network 110 to client computer systems 150 connected through networks 110 and 116 in various ways. For example, client 140 is connected directly to network 110 through direct or dial up telephone or other network transmission line. In an alternative topology, clients 130 may be connected through network 110 using a modem pool 114. A conventional modem pool 114 allows a plurality of client systems to connect with a smaller set of modems in modem pool 114 for connection through network 110. In another alternative network topology, network 110 is connected to a gateway computer 112. Gateway computer 112 is used to route data to clients 120 through network 116. In this manner, clients 120, which may be coupled to network 116 by any of the various practices described above, can communicate with each other through network 116 or with server 100 through gateway 112 and network 110.

Networks 110 and 116 may each be organized as either a wide area network (WAN) covering a large geographic area or a local area network (LAN) which encompasses, by comparison, a smaller physical region. Wide area networks may include conventional network backbones, long-haul telephone lines, Internet service providers, various levels of network routers, and other conventional means for routing data between computers. Each network 110 and 116 may be private, for use by members of a particular company or organization, in which case the network is described as an intranet, or public, as for example, a portion of the Internet. Complete isolation from other networks or users is not required for a network to be considered an intranet. For example, users within an intranet may be given access to the public Internet through firewall servers that have the ability to screen incoming and outgoing messages so that network security is maintained. Similarly, a portion of an intranet may be made accessible to customers, partners, suppliers or others outside of a company or organization with the resulting network being described as an extranet. In one embodiment, communications network 116 is a wide area network which includes the Internet, or other proprietary networks including America Online™, Compuserve™, Microsoft Network™, and Prodigy™ and communications network 110 is a extranet local area network.

Using one of a variety of network connection means, server computer 100 can communicate with client computers 150 using conventional means. In a particular implementation of this network configuration, a server computer 100 may operate as a web server if the World-Wide Web (WWW) portion of the Internet is used for network 116. Using the HTTP protocol and the HTML or XML coding language across network 116, web server 100 may communicate across the World-Wide Web with clients 120. In this configuration, clients 120 use a client application program known as a web browser such as the Netscape™ Navigator™ formerly published by Netscape Corporation of Mountain View, Calif., the Internet Explorer™ published by Microsoft Corporation of Redmond, Wash., the user interface of America Online™, or the web browser or HTML/XML translator of any other well-known supplier. Using such conventional browsers and the World-Wide Web, clients 120 may access image, graphical, audio, and textual data provided by web server 100 or run Web application software. Conventional means exist by which clients 120 may supply information to web server 100 through the World Wide Web 116 and the web server 100 may return processed data to clients 120.

Figure 2A:
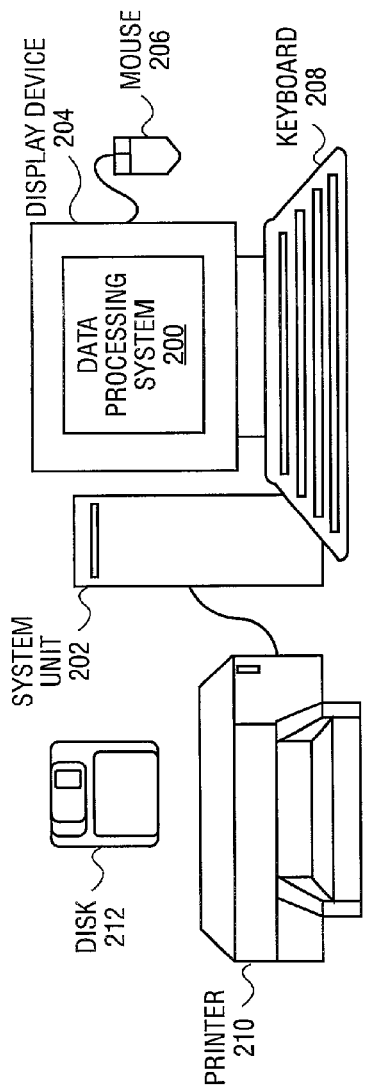
FIG. 2a illustrates a conventional data processing system useable with the present invention.

Having briefly described one embodiment of the network environment in which the present invention operates, FIG. 2a illustrates an example of a data processing system 200 illustrating an exemplary client or server computer system in which the features of the present invention may be implemented. As illustrated, data processing or computer system 200 is comprised of a system unit 202, output devices such as display device 204 and printer 210, and input devices such as keyboard 208, and mouse 206. Data processing system 200 receives data for processing by the manipulation of input devices 208 and 206 or directly from fixed or removable media storage devices such as disk 212 and network connection interfaces (not illustrated). Data processing system 200 then processes data and presents resulting output data via output devices such as display device 204, printer 210, fixed or removable media storage devices like disk 212 or network connection interfaces.

Figure 2B:
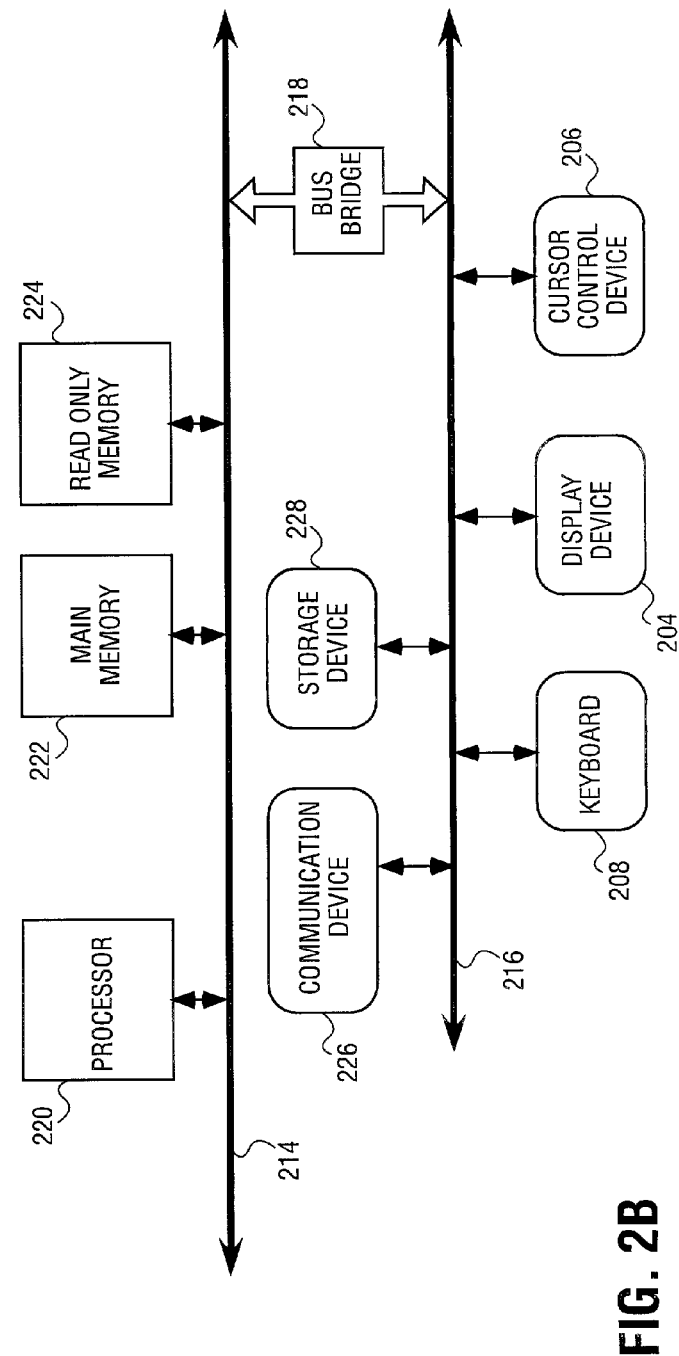

Referring now to FIG. 2b, there is depicted a high-level block diagram of the components of a data processing system 200 such as that illustrated by FIG. 2a. In a conventional computer system, system unit 202 includes a processing device such as processor 220 in communication with main memory 222 which may include various types of cache, random access memory (RAM), or other high-speed dynamic storage devices via a local or system bus 214 or other communication means for communicating data between such devices. Main memory 222 is capable of storing data as well as instructions to be executed by processor 220 and may be used to store temporary variables or other intermediate information during execution of instructions by processor 220. Computer system 200 also comprises a read only memory (ROM) and/or other static storage device 224 coupled to local bus 214 for storing static information and instructions for processor 220. System unit 202 of data processing system 200 also features an expansion bus 216 providing communication between various devices and devices attached to the system bus 214 via bus bridge 218. A data storage device 228, such as a magnetic disk 212 or optical disk such as a CD-ROM and its corresponding drive may be coupled to data processing system 200 for storing information and instructions via expansion bus 216. Computer system 200 can also be coupled via expansion bus 216 to a display device 204, such as a cathode ray tube (CRT) or a liquid crystal display (LCD), for displaying information to a computer user. For example, image, textual, audio, or graphical depictions of product data and other types of image, graphical, audio, or textual information may be presented to the user on display device 204. Typically, an alphanumeric input device 208, including alphanumeric and other keys, is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device, such as the WebTV Networks™ Internet terminal or the Oracle™ NC. Client 150 may also be a laptop or palm-top computing device, such as the Palm Pilot™. Client 150 could also be implemented in a robust wireless telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a network infrastructure such that illustrated in FIG. 1 and described above.

The system of the present invention includes software, information processing hardware, and various processing steps, which will be described below. The features and process steps of the present invention may be embodied in machine or computer executable instructions embodied within media such as disk 212. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

The present invention is a system and method to configure and provide network-enabled three-dimensional computing environments. An introduction to the concept of the present invention is presented below followed by a detailed description of the architecture and processes of the present invention.

When a conventional computer user turns his or her computer on, he or she sees a flat desktop computing environment with icons on the glass surface of the monitor; currently, no one "owns" the computer desktop or has done much with the desktop other than simple screen savers. The present invention improves this desktop computing environment by creating a 3D visual interface for computing environments. With the interface of the present invention, a user turns his or her computer on and the monitor immediately displays the computer desktop as a 360°, 3-Dimensional room "inside" of the monitor—a 3D computing environment. Looking at a 3D-enabled computer, the user will be looking into a computing "room"—a room with depth and dimensions, not a flat glass surface. Standard computer icons, that would normally reside only on the 2D flat glass surface of the monitor, can be spatially placed anywhere in the 3D environment.

For example, the user may want to place the desktop icons on the left wall of his or her 3D computing room (the 3D desktop) and by merely moving the cursor or computer mouse the user can quickly navigate to those icons as easily as he or she can navigate around any physical room. There can be pictures on the walls of the 3D environment computing room displaying family members, advertisements, or other messages. The user can configure his 3D environment to have a desk, file cabinets, fax machine, telephone, calendar and other standard "office room" objects inside his 3D computing environment. Teenagers may want their 3D computing environment to look like a living room or a bedroom; and, as an extension of Instant Messaging and chat, they may want to invite their friends to enter into their 3D environment computing room to chat, or listen to the same music together. Companies may want to use a 3D environment as a tool their customers can download for product updates, sales and marketing, etc. Schools may want to use a 3D environment for remote learning—turn on the computer and use the 3D environment of the desktop as a representation of the classroom, the library, or the school bookstore.

In our physical world, we are accustomed to entering into "rooms" (whether it be the office, the living room, the store, the bedroom, etc.). The present invention makes the computer a more user-friendly and intuitive environment by turning the computer desktop into a "room" that its users can enter.

The 3D Desktop of the present invention can replace the boring, one or two-dimensional computer desktop with a web enabled, customizable, media rich environment. This environment can take the appearance of a room, a neighborhood, city or landscape. It can play music, video and animation as well as supporting real three-dimensional objects. New items can be added to the desktop via a simple drag and drop interface. Users can change colors and materials in the scene via the same drag and drop interface. The desktop supports all web functions including email and buddy list interactivity.

In order to illustrate the advantages of the present invention, several scenarios are presented below. These scenarios illustrate the application of the present invention to real-world situations.

Scenario One

A company employs the present invention on their corporate intranet. Each employee now has, via the 3D interface, an office with direct links to the employee manual, standard forms, a 3D campus map locator system, company news, etc. An associate two buildings over can make a virtual visit by asking for entry to another employee's room. This can also be a mechanism for limited file sharing. Company meetings and presentations can be held, on the desktop, in a virtual 3D Conference Room. The special virtual telephone dialing pad allows users to make free Internet calls.

Scenario Two

A furniture company employs the present invention on their website. They provide the 3D computing environment of the present invention free to their clients via their web site. Their version allows users to re-configure the shape and height of their rooms as well as to manipulate colors of walls, ceilings, floors etc. A special utility allows users to add their own photos to window frames to simulate the view from their window. The furniture company makes their entire furniture line available to drag and drop into the scene so that prospective purchasers can see how the furniture works in their own home. When invited, a 3D environment character visits the users room to offer advise on assembly of the new furniture and introduces a video tutorial, which streams video assembly instructions into the space. In this scenario, the furniture company is not only branding users, but they are also building client satisfaction and reducing their customer support expenses. When the user has added furniture into the room to their satisfaction, they could then purchase the selected furniture. This makes the room similar to an e-commerce shopping cart. User interactions within the room can also be tracked including how long they visited the space, what they looked at and for how long. This data can then be used for profiling user preferences and in focused marketing.

Scenario Three

A toy company employs the present invention on their website. They are using it as a free, downloadable doll house on the toy company's web site. Little girls can have their home computer look like a doll house. They can navigate from room to room. They can add furniture and re-arrange it as they choose. They can modify the color of the walls as well as the sofa. The lastest doll or action figure and its accessories are also in the house. The toy company's music channel is playing on the tiny radio. A toy TV displays the latest in the toy company's doll fashions. Of course, the toy company has its logo branding and advertisements within the doll house. Friends, sales people and customer service representatives can visit and interact with the user in the space. An object moved by one person is seen by all.

Net-Based Architecture of the Present Invention

The 3D computing environment concept of the present invention employing a three-dimensional user interface allows for extrapolation into the possibilities of networked "rooms." The initial architecture described below reflects one possible embodiment for introducing linked "rooms", using the Internet as the network of choice.

Figure 3:
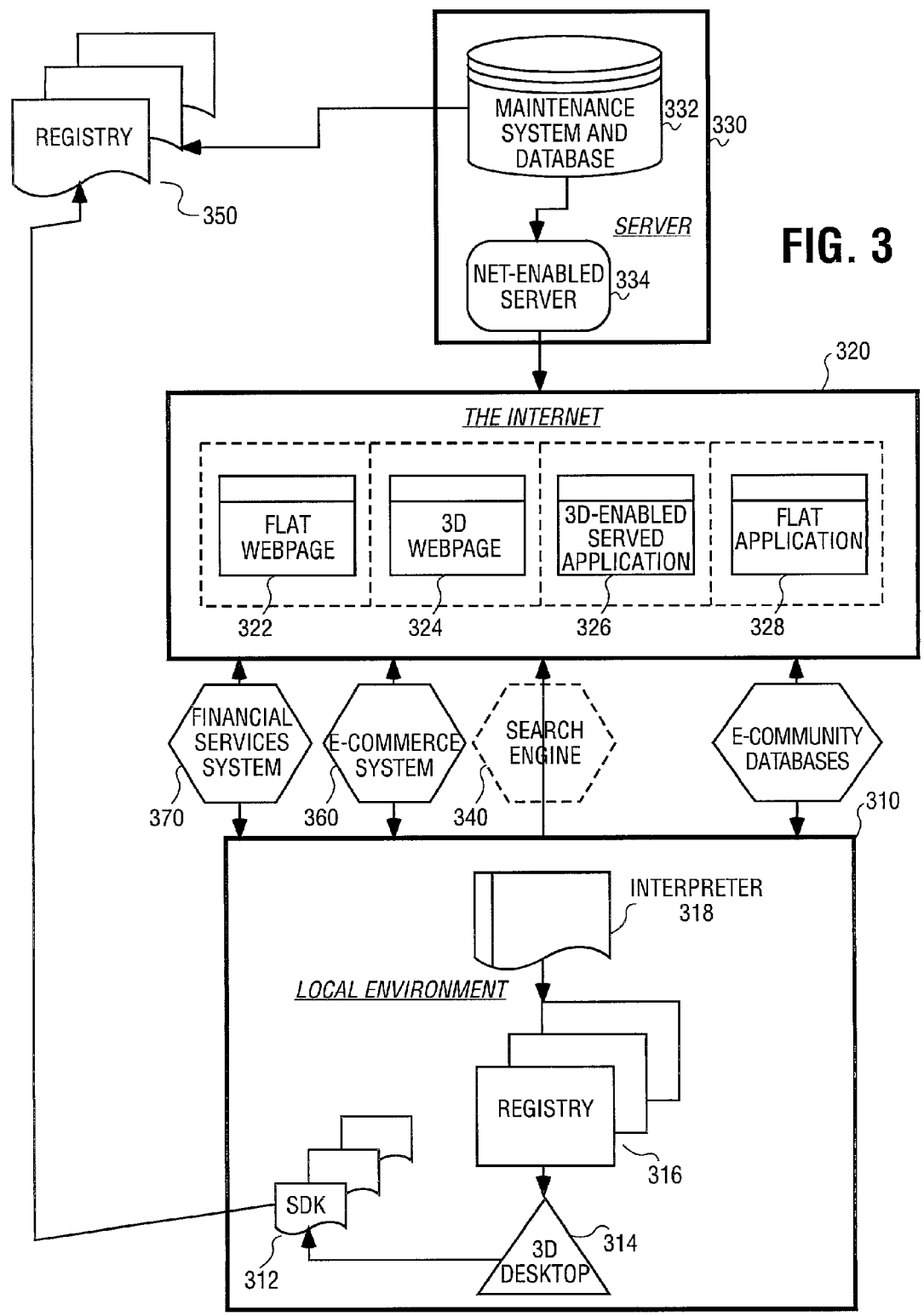
FIG. 3 illustrates a system diagram of the architecture of the 3D computing environment of the present invention.

The Internet-based architecture of the 3D computing environment of the present invention (hereafter referred to as "network-enabled 3D computing environment") consists of a number of conceptual objects: the user, the Internet, the server, the search engine, and the registry. Referring to FIG. 3, each of these objects are described in more detail below.

The user object 310 contains everything that happens at a single computer, manned by a human who connects to the Internet. The Internet object 320 contains everything that is served to the user by the server. The server object 330 contains everything needed to serve up webpages and/or applications to the network-enabled 3D computing environment-enabled user.

The search engine 340 is a special case of the standard search engine: it is a search engine enabled for the network-enabled 3D computing environment. The registry object 350 is a database that distributes and tracks the network-enabled 3D computing environment visual objects, stores objects to be downloaded to the user object 310 and the network-enabled 3D computing environment, and contains software updates for the network-enabled 3D computing environment's structured software developer's kits (SDKs) 312.

User Object

The user object contains four components in one embodiment of the present invention:

3D Desktop:

The 3D desktop 314 is the 3D interface of the present invention. It is a three-dimensional user interface, allowing the user to navigate their computer's contents with ease. The network-enabled 3D computing environment extends this 3D paradigm, to allow the user to connect to the Internet, and view it as a series of three-dimensional objects, some of which will be represented as two-dimensional (or "flat") interfaces. The present invention's 3D Desktop includes a quick-to-download software file that converts the user's conventional 2D desktop into a 3D "room" environment. The present invention's 3D desktop is easy to configure, and allows the user to place standard icons within a 360° spatial environment.

Repository:

The repository 316 is a database containing all the graphical objects used for three-dimensional representation to the 3D desktop. It includes objects downloaded from the Internet 320, updates from the registry 350, and user-defined objects.

SDK:

The SDK 312 allows the user to create 3D-enabled applications, as well as new graphical objects for the user's 3D interface. Once again, the network-enabled 3D computing environment becomes an add-on to the standard user SDK 312.

Interpreter:

The interpreter 318 is a utility that is specific to the network-enabled 3D computing environment. It allows the 3D desktop 314 to interpret incoming data from the Internet 320, for presentation to the desktop 314. This includes: applications 326 and webpages 324 specifically enabled for the 3D environment, applications 328 and webpages 322 not enabled for the 3D environment, and standard industry plug-ins (such as RealAudio, Flash, etc.). It is assumed that the interpreter will have increasing functionality for handling plug-ins in a fashion that makes sense in the 3D paradigm. The interpreter 318 can also be used to sort through 3D-specific functionality in the plug-ins produced by various major players in the plug-in industry.

Internet Object

The Internet object 320 contains four components in one embodiment of the present invention:

Flat Webpages:

The standard webpage 322 currently only possesses functionality to be perceived in a flat context. The interpreter can convert these webpages 322, on the fly, to three-dimensional functionality.

Flat Applications:

Most network-aware applications 328, whether they exist on a webpage or off, are not currently enabled for 3D functionality. This includes Macromedia Director, Microsoft Outlook, etc. 3D Webpages:

In one embodiment of the present invention, the 3D computing environment uses an XML-based markup language, easily embedded in XHTML or XML webpages, that allows a webpage to be simultaneously delivered as a flat webpage to standard browsers, or as a three-dimensional webpage to interpreters 318 of the present invention. This extended markup language allows users to develop 3D webpages 324 free from any additional authoring tools, although such authoring tools could be included in the SDK 312 for ease of use.

3D-Enabled Applications:

Applications 328 built by other corporations can also use the extended markup language of the present invention to make their tools 3D-enabled. By hosting standard markup language libraries at the registry 350, corporations could add to the markup language in an extensible, standardized fashion. In this fashion, corporations can deliver their tools to both a three-dimensional audience and a flat audience.

Server Object

The network-enabled 3D computing environment server contains two components in one embodiment of the present invention:

The network-enabled 3D computing environment Server: Since regular webservers may or may not handle all the protocols needed to deliver 3D desktop objects, a 3D net-enabled webserver add-on 334 is required. Add-ons can be easily written for Apache, Frontpage, and other servers. This additional utility would allow the server to recognize and handle the network-enabled 3D computing environment.

The Server Maintenance System and Database: Any network-enabled 3D computing environment server should include a system to communicate with the registry 350, allowing for periodic updates to the network-enabled 3D computing environment-based protocols, as well as increasing the library of graphical objects that could be stored on the server 330. By storing the objects on the server 330, the SDK 312 could be used by users to automatically generate 3D-enabled webpages without having the SDK on their desktop.

Search Engine

Searching the World Wide Web is currently accomplished by flat interfaces. This limits the three-dimensional experience of the 3D computing environment, especially because searching is one of the primary activities of online "surfing". To this end, the present invention includes a three-dimensional search interface. Alternately, the present invention can modify existing search engines to use the extended markup language to produce their own 3D-enabled pages.

Registry

The registry 350 can act as both a community focus for the network-enabled 3D computing environment and a net-based repository for 3D graphical objects and extensions to the conventional markup language. From this registry 350, new objects can be served to the desktop 314 for specific users, updates to the 3D desktop software can be passed to the user, advertising hits can be tallied, etc. The possibilities for enabling the 3D desktop 314 to communicate with the registry 350 are numerous.

E-Commerce System

The present invention's e-commerce system 360 takes advantage of key areas of a user's 3D computing desktop environment that are reserved for placing messages and advertisements from commercial clients. When used with the infrastructure of e-commerce systems and the present invention's registry 350, the present invention's always-present availability on a user's desktop 314 can enable additional opportunities for e-commerce.

Financial Services System

The Financial Services system 370 of the present invention applies more advanced features, such as: (1) for use in Corporate Intranets; (2) as a tool for Retail Financial Planners and Institutional Financial Services users to more efficiently process data and make more informed decisions; and (3) to conduct additional transactions in less time. This gives retail customers a more intuitive tool to interact with the data they receive from financial institutions, and to conduct banking and other financial transactions online.

Extensions of the Present Invention

The network-enabled 3D computing environment of the present invention has several extensions, including: the introduction of real-time avatars. Avatars are virtual representations of users, allowing them to interact with other users across a network. The ability to create an interactive online community is very powerful. Such a utility would allow for intra- and inter-company meetings, the extension of the online communities which exist today, virtual concerts, online games, etc. Other uses of avatars with the present invention are described herein in a subsequent section.

Companies such as id Software (the makers of Quake), Blizzard North (the makers of Diablo), and others have explored limited avatar use with startling results. The Diablo server had, at one point, over 320,000 simultaneous connections. The present invention can be used with this conventional technology to create a population of network-enabled 3D computing systems, with people interacting in virtual cafes, offices, showrooms, etc. The network-enabled 3D computing environment allows for the creation of a cyberspace experience previously only available in science fiction.

Figure 4:
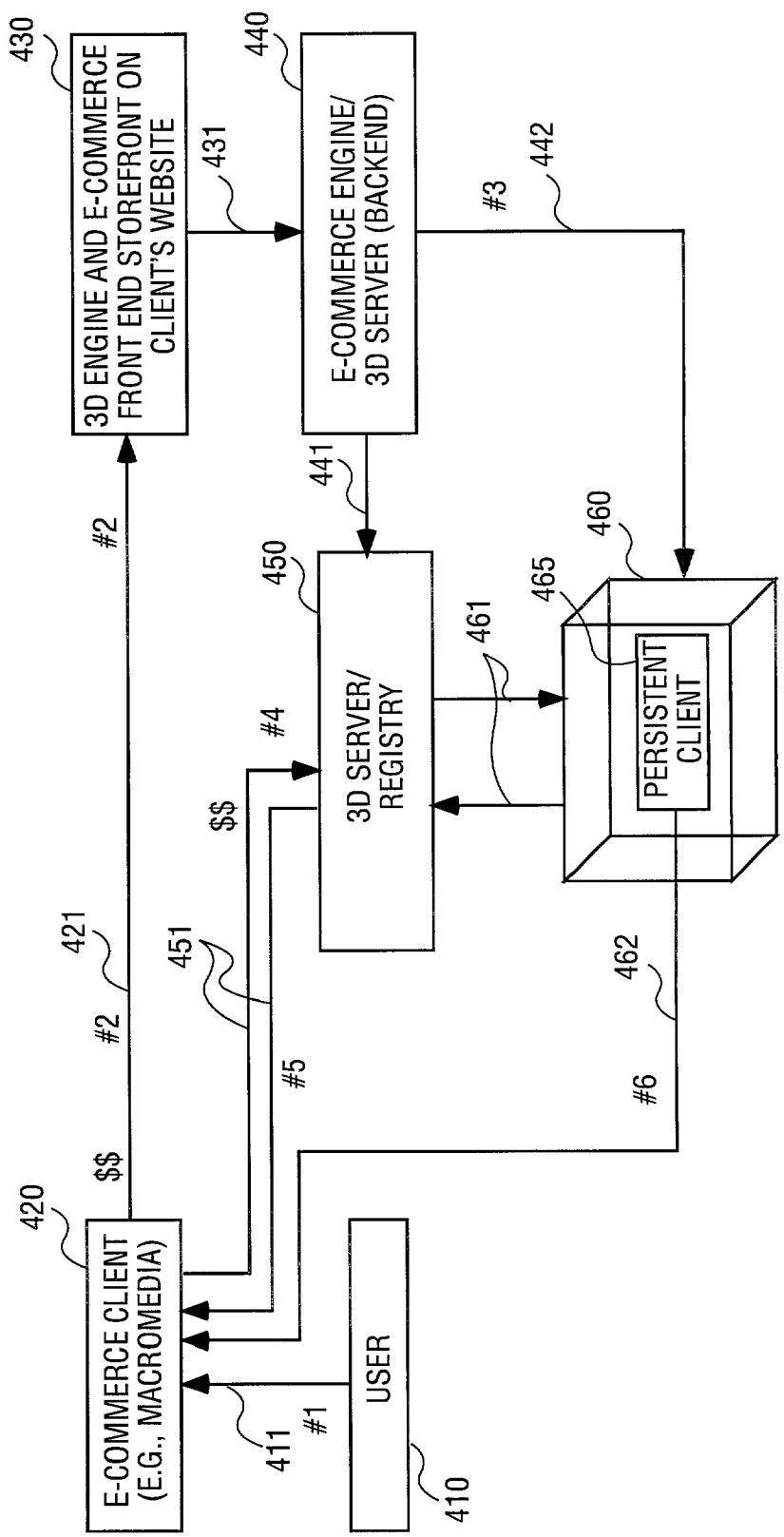
FIG. 4 illustrates the use of the present invention in an e-commerce setting.
Figure 5:
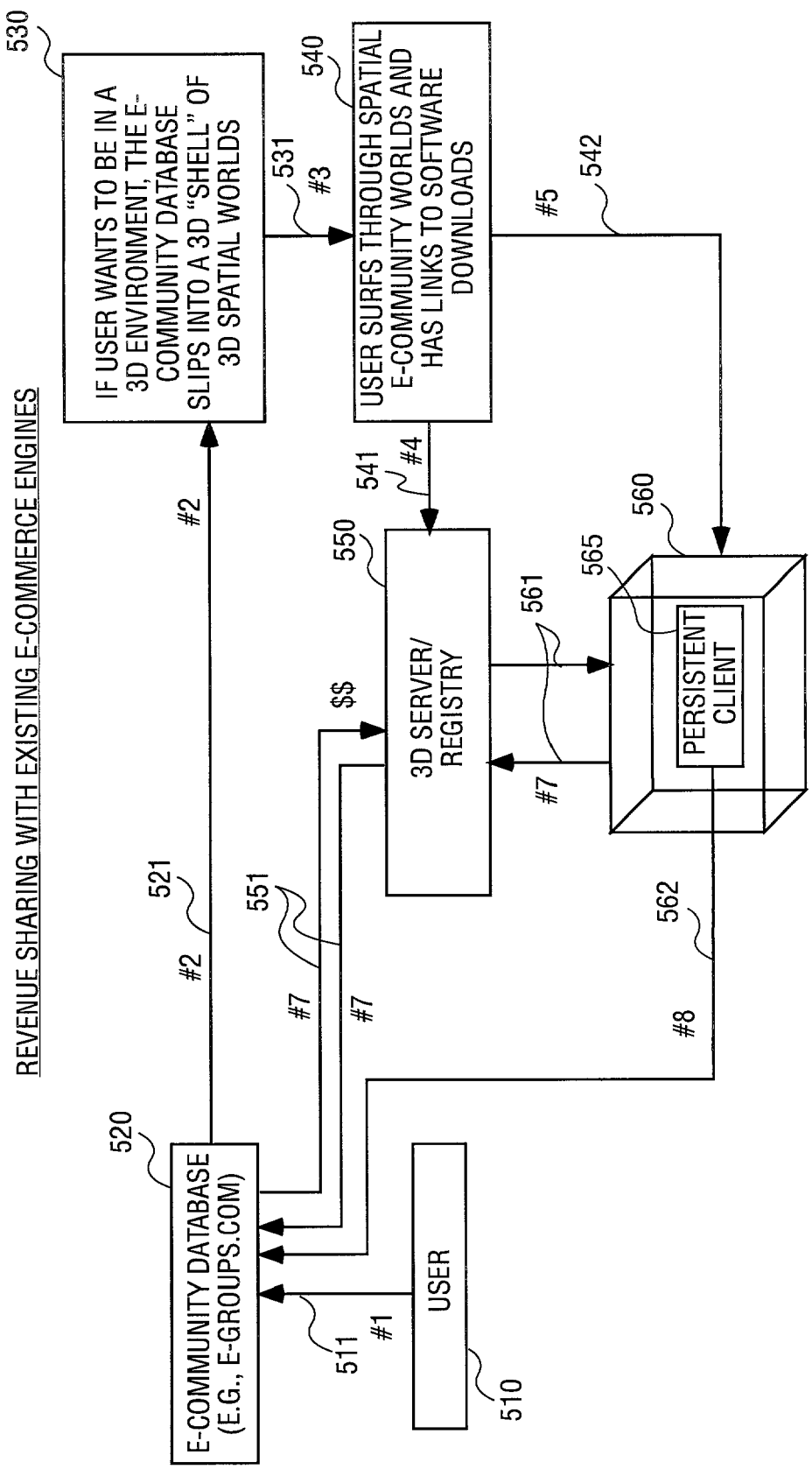
FIG. 5 illustrates the use of the present invention in an e-community database setting.

Referring now to FIGS. 4 and 5, the structure and processes provided and enabled by the present invention are illustrated. In FIG. 4, the present invention provides a structure and process for enabling existing two-dimensional e-commerce engines to employ the three-dimensional computing environment in an e-commerce setting. In FIG. 5, the present invention provides a structure and process for enabling existing two-dimensional e-community databases to employ the three-dimensional computing environment in an e-community database setting.

Referring to FIG. 4, the use of the present invention in an e-commerce setting is illustrated. As shown in FIG. 4, a user 410 accesses a public network such as the Internet and logs onto a business website to order software. Such business websites are common on the Internet (Example: Macromedia). It will be apparent to one of ordinary skill in the art that many e-commerce websites exist on the Internet through which software may be ordered and purchased. The user 410 access to a networked e-commerce website 420 is illustrated in FIG. 4 with an arrow 411. In this example of the present invention in an e-commerce context, the webpage accessed by user 410 appears as any typical webpage provided by the particular e-commerce provider 420. However, by previous agreement between a provider of the present invention and the e-commerce provider 420, the user 410 access and request for purchase to e-commerce client 420 causes the e-commerce client 420 software to make an access to a 3D engine and e-commerce front end store front 430 on e-commerce client website 420. This access 421 to the 3D engine and e-commerce front end 430 is not apparent to user 410. However, 3D engine and e-commerce front end 430 drive the e-commerce transaction with user 410. Thus, 3D engine and e-commerce front end 430 processes the user 410 order and downloads the requested or purchased software to the user's client machine 460. Because 3D engine and e-commerce front end 430 controls the order processing and download transaction with user 410, the 3D engine and e-commerce front end 430 may append a persistent 3D environment client kernel 465 to the software requested or purchased by user 410. Thus, the user 410 requested or purchased software with the appended 3D environment persistent kernel 465 is downloaded to client machine 460 as shown in FIG. 4 by arrows 431 and 442. When user 410 installs the downloaded software on client machine 460, the persistent 3D kernel is automatically installed on the user's desktop environment at client machine 460. Following the downloading of the requested or purchased software with the appended 3D environment Persistent Client kernel 465, e-commerce engine component 440 automatically notifies the 3D environment server 450 via interface 441. In this manner, the 3D environment server is now aware of the identity and/or location of a client machine 460 to which the persistent 3D kernel 465 has been downloaded. Upon automatic installation of the 3D Persistent Client kernel 465, the user is given a demonstration of the 3D environment software and given the choice to activate a full three-dimensional computing environment on the user's desktop at client machine 460. If the user 410 chooses not to activate the 3D computing environment, the 3D environment Persistent Client 465 nevertheless remains active in an unobtrusive two-dimensional persistent window on the user's desktop for the delivery of advertisement or messages to the user's desktop. As such, the present invention provides a persistent presence on the user's desktop for the placement of advertising, messages, or the gathering of information about the user for the benefit of the e-commerce engine 440 with which the present invention has been connected. Because the three-dimensional environment server 450 was advised by component 440 of the download of the persistent kernel 465 to client system 460, the 3D server 450 may keep a registry of such downloads along with corresponding user profiles, buying patterns, searches, etc. This registry and associated user information can be made accessible to the e-commerce client 420 via interface 451 with 3D server 450. In this manner, the e-commerce supplier 420 can thereby obtain information about users of the e-commerce site via 3D server and registry 450. Because the present invention through 3D server 450 can provide e-commerce client 420 with a wealth of information about particular users, the e-commerce client 420 may generate targeted advertising or product offerings for particular client machines 460. In this manner, the present invention becomes a valuable information link between Internet e-commerce suppliers and e-commerce consumers.

Referring to FIG. 5, the use of the present invention in an e-community database setting is illustrated. As shown in FIG. 5, a user 510 may access the public network, such as the Internet, and log into a conventional e-community database 520 (such as e-groups.com). Once the user has accessed the e-community database, the user typically navigates to a particular selected area of interest, as provided by the conventional e-community database technology. For example, the user 510 may navigate to a special interest area related to, for example, photography. By prior agreement between the e-community database provider and the provider of the technology of the present invention, the e-community database website can be augmented to include a user interface for the selection and activation of a three-dimensional version of the e-community database. Using this interface, user 510 may activate a 3D version of the e-community database 520. As a result of this activation, the e-community database website communicates with a three-dimensional environment spatial shell component 530. Three-dimensional shell component 530 includes a three-dimensional spatial representation of the two-dimensional environment previously provided by e-community database 520. Instead of viewing email text, photos, or objects in a flat two-dimensional environment, the user can now move through the e-community database 520 in a three-dimensional computing environment, interacting with others, and viewing the content of the e-community database 520 in a compelling three-dimensional environment. In this environment, visual real estate is created and the user experiences a sensation of sharing a physical three-dimensional space with other users. In this three-dimensional spatial environment, advertising and other paid messages can be placed and directed specifically to those interest area users. At block 540 in FIG. 5, the user may navigate through the three-dimensional spatial e-community worlds and link to other sites and/or perform software downloads via interface 542 to the client machine 560. Once in the three-dimensional computing environment enabled e-community database, user 510 has an option to download the three-dimensional environment software to the desktop of his or her client machine 560. As a result of this download, the three-dimensional environment server 550 is notified of the client download via interface 541. In this manner, the three-dimensional server 550 and the registry contained therein is informed of the three-dimensional software download to a client machine 560 and may keep track of the location and/or identity of the user who has downloaded and installed the three-dimensional computing environment software. Email or software downloads from the e-community database 520 to its users will include a link to initiate the downloading of a three-dimensional environment Persistent Client kernel 565 to the desktop on the client machine 560. In this manner, the e-community database provider 520 retains a persistent presence for a three-dimensional computing environment on client computer 560. Again, as described above, this Persistent Client kernel 565 may be used to obtain client information such as profiles, buying patterns, searches, etc. which can be retained in the registry of 3D server 550. This user information retained in the registry of 3D server 550 may be accessed and used by the e-community database provider 520 via interface 551. In this manner, e-community database provider 520 may employ targeted advertising, targeted information publications, links, or other information particularly relevant to individual client machines 560.

Figure 6:
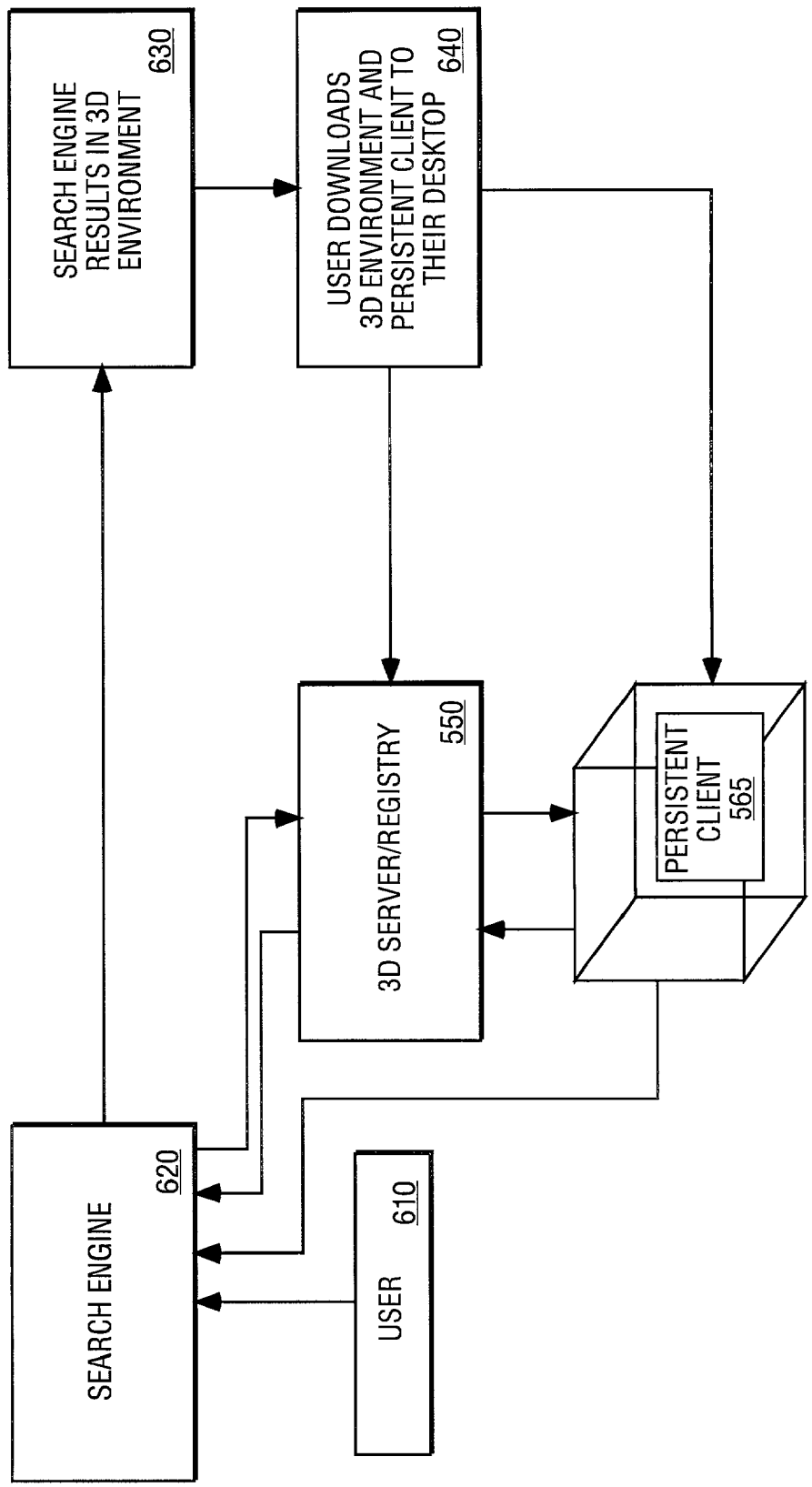
FIG. 6 illustrates the use of the present invention to establish search engine presence on desktop or other information display.
Figure 7:
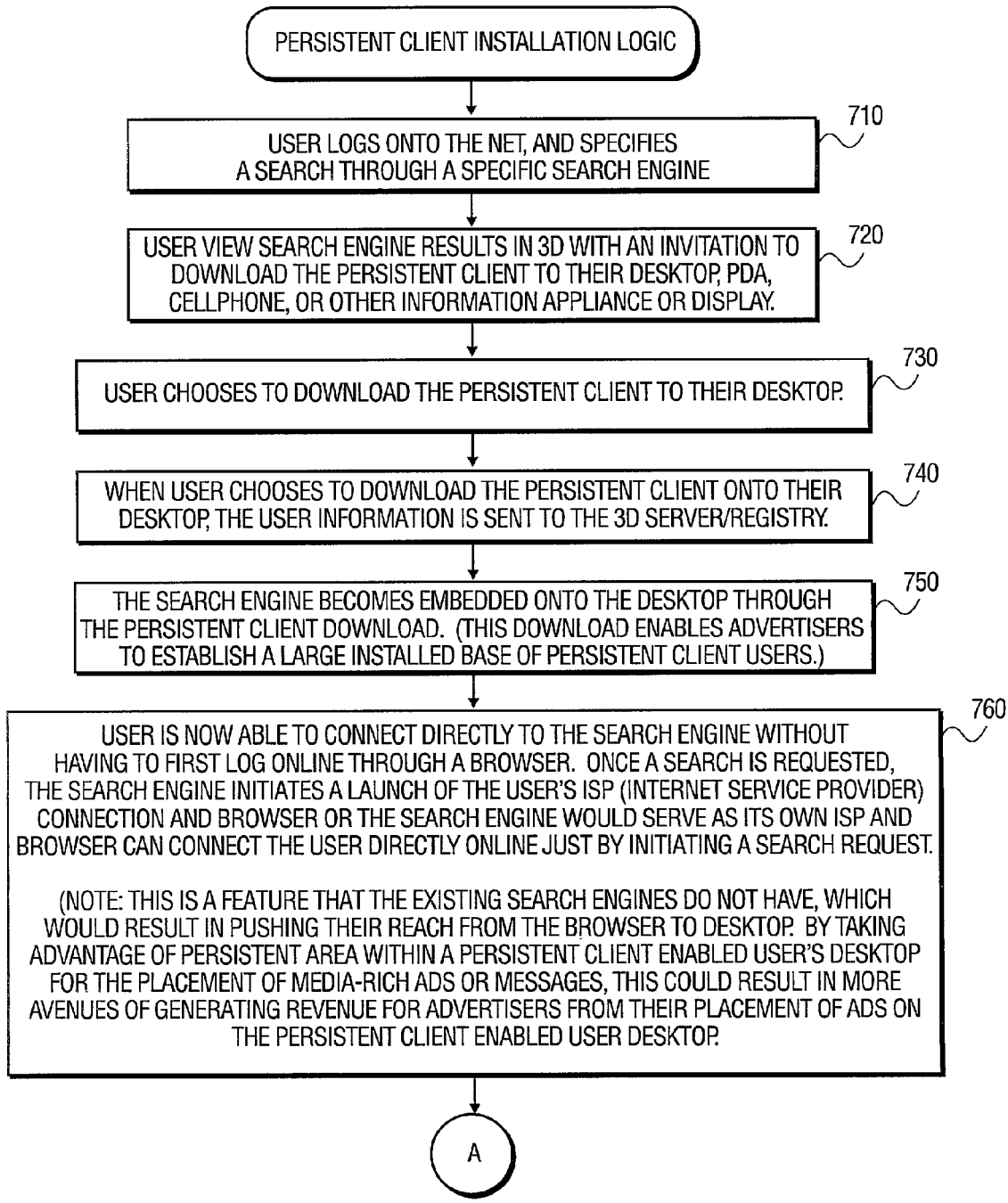
FIGS. 7–8 are flowcharts illustrating processing logic employed by the present invention.
Figure 8:
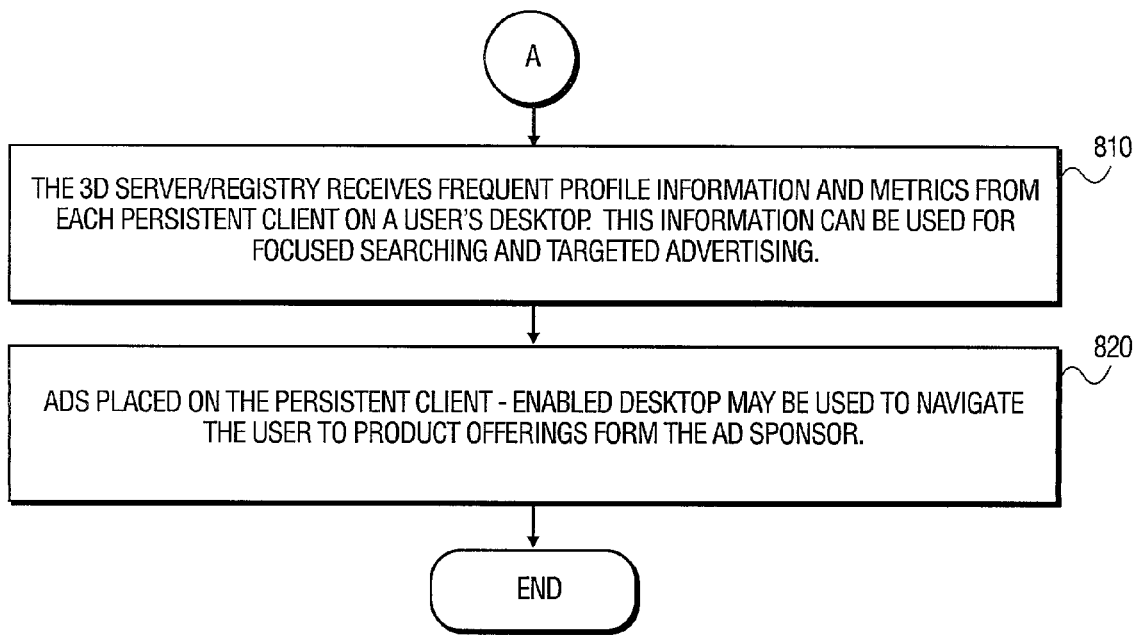

Referring to FIGS. 6–8, the present invention is used to install a Persistent Client on a user desktop and to embed a particular desired search engine on the desktop. As shown in FIG. 6, the user 610 interacts with a search engine 620 to obtain search engine results 630 which are rendered in the 3D environment of the present invention described above. In a manner described in more detail in FIGS. 7 and 8, the user downloads the three dimensional environment and the Persistent Client of the present invention to the user desktop.

Referring to FIGS. 7 and 8, the Persistent Client and search engine installation logic of the present invention is illustrated. In a first step, a user logs onto a network and specifies a search through a specific search engine using conventional technology. (Block 710). Next, the user views the search engine results through a three-dimensional rendering interface. Additionally, the user receives an invitation from the present invention to download the three dimensional environment and the Persistent Client of the present invention to their user desktop, personal digital assistant (PDA), cell phone, or other information appliance or display device. (Block 720). Next, user may choose to download the three dimensional environment and the Persistent Client to their user desktop. (Block 730). When the user chooses to download the three dimensional environment and the Persistent Client onto their desktop, the user information is sent to the 3D server/registry 550. (Block 740). As a result of the user choosing to download the three dimensional environment and the Persistent Client, the previously specified search engine becomes embedded onto the user's desktop through the download of the three dimensional environment and the Persistent Client (i.e., the search engine has been pushed from the internet portal to the user's desktop). The name of the particular search engine (For Links there to) is placed within a toolbar of the Persistent Client window or in a separate area on the user's desktop, which can be accessed prior to being connected to a browser or portal. This download enables advertisers to establish a large installed base of Persistent Client users. (Block 750). Once the search engine, three dimensional environment and Persistent Client are installed on the user's desktop, the user is now able to connect directly to the search engine without having to first log on through a browser. Once a search is requested, the search engine initiates a launch of the user's Internet service provider (ISP) connection and browser or the search engine can serve as its own ISP and browser and initiate a connection for the user directly online just by initiating a search request. This feature of the present invention enables advertisers to take advantage of the Persistent Client on the user's desktop for the placement of advertising or messages. (Block 760).

Referring to FIG. 8, in a next step, the 3D server/registry 550 receives frequent profile information and metrics from each Persistent Client 565 on a user's desktop. This information can be used for focused searching and targeted advertising specific for a particular user. (Block 810). Subsequent advertising placed on the Persistent Client-enabled desktop may be used to enable a user to navigate to product offerings offered from the advertisement sponsor. (Block 820).

When the user turns his computer on, the present invention displays a spatial 3D environment that can be navigated 360 degrees from left to right. When the user logs onto an intranet or internet system, the present invention will go to a server that contains advertisements or messages that can be dowloaded and buffered onto the user's computer. The computer will periodically display a different advertisement or message within the Persistent Client Window per a predefined cycling period for rotating the advertisements or messages that are being displayed. When the computer system detects that the user does not have an application window open that covers the user's viewing of the Persistent Client Window or that only the user's computer desktop is being displayed, it will continue to display advertisements or messages within the Persistent Client Window that are being cycled from its buffer. In this way, when the user first turns the computer on, the computer will automatically display an advertisement or message in the Persistent Client Window and it will periodically display other advertisements or messages to the user as long as the Persistent Client Window can be displayed or while the enter desktop is being displayed. When the user opens an application program that overlaps and covers the display of the Persistent Client Window, the advertisement or message that is currently being displayed will remain in the Persistent Client Window until the user closes the application software and returns back to the desktop (or reduces the display of the application software so that the Persistent Client Window can be viewed) and at that time a new advertisement or message will appear in the Persistent Client Window to be viewed by the user. In this manner, while the user is offline, the present invention will allow for the display of many different advertisements or messages in the Persistent Client Window that are retrieved from its buffer and rotated one after the other over a predefined cycling period, as long as the Persistent Client Window can be fully viewed. The user also has the ability to advance forward or backward in retrieving and viewing these advertisements or messages that are stored in buffer by use of the "previous" or "next" icons that located on the toolbar of the Persistent Client Window.

When the user logs online, the present invention retrieves additional advertisements and messages from a server and stores them in buffer for the present and future cycling or display of those advertisements or messages in the Persistent Client Window to the user.

If, while the user is offline and not connected to the internet, the user clicks onto an advertisement or message within the Persistent Client Window, the present invention will launch a program to log the user online for connection to the internet, if additional information is to be retrieved by the present invention from a remote server.

Features of the Persistent Client Window of the Present Invention

Figure 9:
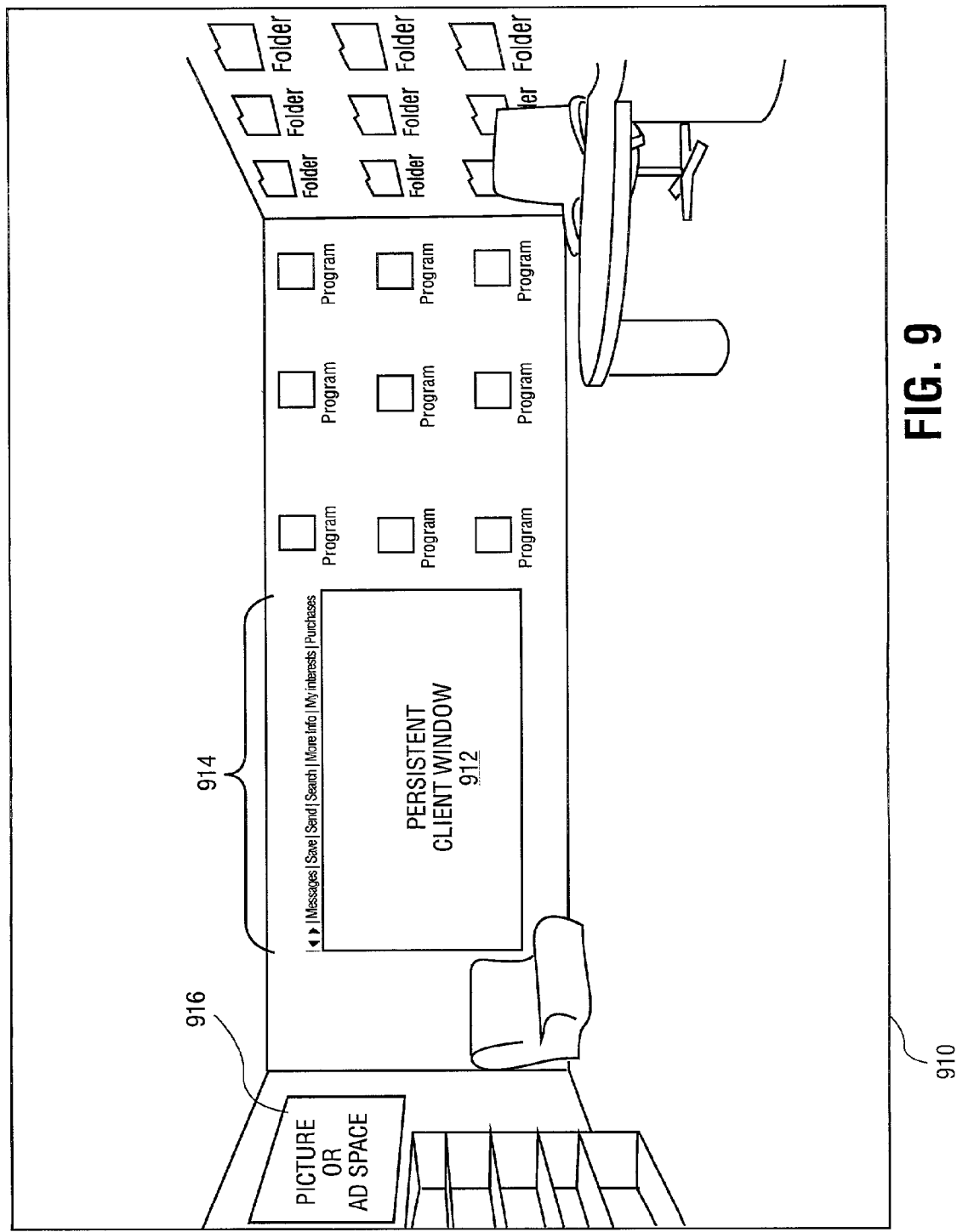
FIG. 9 is an example of a user desktop illustrating the presence of the Persistent Client Window.

FIG. 9 illustrates one example of a user desktop 910 with a Persistent Client Window 912.

The Persistent Client Window 912 includes a toolbar 914 at the top, which lists features that the user can use to interact with or through the Persistent Client 565. Clicking on these items enable the features such as those that are described below:

| | |
|---|---|
| MESSAGES: | The ability to send and receive audio/text/graphic/video/photographic/facsimile messages to/from other users of the Persistent Client Window system. |
| SAVE/BOOKMARK: | The ability to bookmark and save favorite advertisements or messages that are being displayed in the Persistent Client Window 912 for future retrieval. |
| ← → | The ability to scroll to previous or next advertisements or messages to appear within the Persistent Client Window 912. |
| SEND: | The ability to send the information being displayed in the Persistent Client Window 912 to another viewer's Persistent Client Window by sending an e-mail: |
| | (1) By clicking onto the "send" button, an e-mail window would appear and the user can insert the e-mail address of the recipient. Once the recipient retrieves and opens the e-mail, the advertisement or message would be shown as a link that when clicked on will be retrieved from a central server and simultaneously displayed in the recipient's Persistent Client Window 912, as well as in the viewer's standard e-mail display or desktop. |
| | (2) The information can also be sent directly from the Persistent Client Window 912 user to the Persistent Client Window system <u>address</u> of the recipient and would appear in the Persistent Client Window <u>message</u> box of the recipient. This means of messaging is internal to the users of the Persistent Client Window system. |
| SEARCH: | The ability to define general areas of interest or specific information that can be searched directly from a local server or from other servers on a network for advertisements, messages, etc., that have been previously displayed or formatted to be displayed in the Persistent Client Window 912. |
| MORE INFO: | The ability to send a message back to the source of the advertisement/message/host that you want more information to be sent to you on what is being shown in the Persistent Client Window 912 or that you want someone to contact you with more information. Your contact details (e-mail, telephone numbers, etc.) will be forwarded back to the source or host of the advertisement/message. |
| YOUR INTEREST: | The ability to define and select the types of advertisements, messages or other information that the user wants to see displayed in the Persistent Client Window 912. |
| PURCHASE: | The ability to initiate purchase of whatever is being displayed in the Persistent Client Window 912. |

Advertisements, messages, pictures, video and other information or data contained within the Persistent Client Window 912 can be moved to the desktop and vice versa through conventional drag-and-drop procedures.

The present invention includes functionality to place 2D or "3D/spatial" advertisements, promotions, or messages in the Persistent Client Window 912 that, when clicked on by a user/viewer, will activate full or partial-screen interactive 3D virtual reality environment advertisements that can also be equipped with e-commerce capabilities, such as links to product/service ordering websites. As shown in FIG. 9, a portion 916 of the persistent client desktop environment 910 is allocated for the positioning of 2D or 3D advertisements, pictures, promotions, or messages. In a configuration mode, a user can use conventional drag & drop user interface techniques to position a desired advertisement in region 916. Subsequently, a user/viewer can view the advertisement in region 916 and select a portion of the advertisement or a related link by clicking on a portion of region 916 using a conventional mouse. Upon selection of the region 916, an expanded view of the advertisement is presented. Upon activation of a related link provided within region 916, the user is taken to a related website where an e-commerce transaction corresponding to the advertisement may be initiated.

The present invention provides this virtual reality (VR) environment for a client, who can use the "drag and drop", easy-to-configure nature of the environment provided by the present invention to allow users on their website to customize a spatial environment with a new line of products they had created for the environment. Further, the present invention can be used to embed a similar VR/spatial environment behind a static or dynamic two dimensional (2D) advertisement that is placed in the Persistent Client window 912. For example, a 3D or 2D advertisement may be positioned in the Persistent Client window 912. When this advertisement is selected by a user/viewer clicking on it, the advertisement enlarges into a partial or full-screen VR/spatial environment that the user can move through spatially and take advantage of the media-enriched features of the advertisement.

As an example of this functionality of the present invention, refer again to FIG. 9. As shown in FIG. 9, the Persistent Client Window 912 is shown. An advertisement may be placed in the Persistent Client Window 912. When a user clicks on the advertisement, the advertisement increases in size to partially or completely fill the screen of the computer monitor. The advertisement may be rendered as a 2D or 3D image. If the advertisement is a 3D VR environment, the user can click onto an avatar section of the advertisement and choose a virtual body (avatar) that will be the identification or representation of the user's presence in the 3D advertisement VR environment. The user can then virtually walk around that advertisement, meet other virtual users who have entered into the collaborative VR advertisement in the same way from their own computer desktops. The virtual users can converse with each other about the content of the advertisement. This virtual conversation can be implemented by capturing conversational input typed or spoken into the computer system of each participating user in the virtual space. The conversation is rendered to other participating users via conventional displayed text blocks or spoken audio played through a computer audio system. A typical conversation between virtual users may proceed as follows. ("Have you tried this product that's being advertised?" "Yes, I have . . . it's great. I bought it at . . . " "What have you used it for?" "I've used it for doing . . . , but I was talking with another person in this advertisement and she was telling me that she uses it for . . . I think I'll give that a try." "Thanks for the advice. I think I'll buy this product and give that a try too. By the way, does the manufacturer have other products like this?")

The sponsor of the advertisement can have virtual representatives (corporate avatars) within those VR advertisement environments to meet users (their targeted audience members that are now inside of their VR advertisement), to lead one-on-one or group discussions, answer any questions, share any additional information or promotional input, etc.

Using the present invention, it is also possible to develop e-communities around VR advertisement environments, in much the same way as e-communities have developed around corporate stock information sites (like www.ragingbull.com) where individuals can interact with others that share their same interests. In the example of the stock information sites, the interest would be that particular stock or anything that has an affect on that stock's price. In our VR advertisement environments, the interest area would be in whatever the advertisement is promoting.

Advertisers strive to achieve maximum stickiness to their advertisement placements on the Internet. Advertisement placement on TV and radio lasts just a few seconds, but the sponsors hope that viewers will remember the advertisement message long afterwards. A VR advertisement as described herein can be used to create a community of viewers that stay within the advertisement environment for a significantly longer period (i.e., achieve a higher level of stickiness) than can be achieved by TV, radio or print advertisements. In this way, the present invention can provide advertisers a means to extend their "stickiness" and branding. The present invention can also provide users a means to participate in a community of other users with the same interests.

The present invention includes the ability for users to leave the "communal" nature of an interactive multi-user VR advertisement environment to customize a "private" or "user-customized" version of the VR advertisement environment on their own desktop. For example, the advertisement sponsor may have objects, textures or colors in a toolbar or other section of the advertisement that the user can drag and drop to customize that VR advertisement environment. The user can jump back into the "communal" VR advertisement environment to interact with others, wherein any customization of that communal environment is controlled by the advertisement sponsor or its representatives. Somewhere within that "communal" advertisement environment, the present invention provides a section showing e-mailed text communications between the users in that environment. A user can also invite others to leave that "communal" environment and come into his/her own "individually-customized" version of the VR advertisement environment and that user can control who can enter that personal/individually-customized environment. Communication between these virtual users can be with graphics, text, voice, pictures, video or other data. The multi-user VR advertisement environments described herein can also be applied to advertisement areas in websites, portals, search engines results and other pages displayed on intranet and internet environments.

Use of Avatars in the 3D User Interface Environment

The present invention can be used to add a whole new level to the "focused marketing" approach of advertisers and e-tailers. As commonly known, advertising on the net has become ubiquitous through the use of banner advertisements, pop up windows, etc. The present invention enables a next generation in online/desktop interfaces. The 3D user interface of the present invention can be augmented to use specially designed avatars as a vehicle for advertisement delivery. As a user navigates through the virtual 3D landscape, certain use patterns or information from the 3D server/registry database triggers a targeted message to be delivered through the use of a 3D character (avatar). The Persistent Client module on the user's database can be used to capture the user's use pattern and other information, which is sent to and retained by the 3D server/registry. The avatar can engage the user in chat to deliver the advertiser's message, perhaps acquire more data through questions that could be asked of the user, and then present the user with interactive options to engage them further, if they are interested. This approach enables one to capitalize on the use of recognizable characters (i.e. corporate mascots) to 1) enrich the user's experience and 2) reinforce the message of the advertiser through further branding. In some instances, something as simple as the clothing style of the avatar can be used to make a connection with the user. Some examples of how this can be implemented follow.

Scenario A

A sports fan exits a "room" where he/she has previously been engaged in a multi user chat with other sports fans on the topic of their favorite basketball team, the Golden State Warriors. Through the 3D interface of the present invention, the users have been swapping their favorite images of team members using conventional peer-to-peer file transfer functionality. The database of the present invention recognizes this exchange that has taken place and, because Golden State has signed on with the provider of the present invention, sends out a 3D representation (e.g. avatar) of the Warrior's mascot to greet the user as he/she continues on their virtual "walk". The avatar offers the user $5 off on game tickets in exchange for joining their mailing list, filling out a survey, etc., and then informs the user about the Warrior's Persistent Client-enabled virtual locker room where they can chat with certain players during scheduled special events.

Scenario B

A college student orders a new computer online via their Persistent Client-enabled 3D desktop. The 3D server/registry recognizes this event and responds by sending an avatar by to greet the user and inform them of the large line of peripherals available from Company A that are compatible with the system they are purchasing. The avatar wishes the user well with their new computer and leaves them with a virtual coupon for 15% off their first purchase with Company A. The user is informed of hardware options they had not previously been aware of and heads off to Company A's Persistent Client-enabled web site to make another purchase.

Scenario C

A user that frequently downloads hip hop music is exploring the automatically generated landscape via their Persistent Client-enabled 3D desktop. They soon cross paths with an avatar styled out in baggy jeans, ball cap, tennis shoes and headphones. The avatar approaches the user and offers him the opportunity to check out the new track he's listening to on his portable mp3 player. The avatar tells the user that the track is authored by a new artist on Solid Player records, an affiliate of the provider of the present invention. The user is intrigued so he clicks on the avatar's headphones and the mp3 begins to stream through to his machine, thus turning him on to a track he may otherwise have never heard. The avatar then offers the user a direct link to Solid Players Persistent Client-enabled site where he can purchase a license for the album and download it in its entirety.

Scenario D

A young woman has been using her Persistent Client-enabled 3D desktop to gather information on a specific model Toyota she was interested in purchasing. The 3D server/registry recognizes the numerous search queries run on that specific vehicle and responds by dispatching an avatar. While Toyota has not yet partnered with the provider of the present invention, their competition, Mazda, has. As the user steps outside of her virtual "room" to explore, a 3D representation of a 2001 Mazda Protege pulls up and the avatar steps out to greet her. The avatar informs her of how the Mazda is a far superior vehicle for the money compared to the Toyota. The avatar then offers to show her the features of the car online as well as set up an appointment to see test drive the car in person at her nearest dealer. Thus, the woman is interested and Mazda has used the present invention to gain market share away from their competition.

Thus, the variations on the use of the present invention are endless. Using the present invention, the advertisement moves from being a flat texture map on a flat surface to an engaging, interactive, media rich experience that goes hand in hand with the whole 3D concept of the present invention. In the process, the advertisement weary consumer barely recognizes or even minds the fact that they have just received targeted advertising. By implementing this novel concept, the present invention provides more effective marketing strategies to their clients as well as avoiding the trap of simply adapting the tired banner advertisement concept to a 3D environment.

Thus, a computer network-based system and method to configure and provide network-enabled three-dimensional computing environments is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A method comprising:
providing a three-dimensional (3D) computing environment representing a 3D desktop of a first computer system in a 3D environment, wherein one or more icons of the desktop are displayed on a plurality of surfaces of the 3D desktop;
receiving a two-dimensional web page from a Web server over the Internet;
converting the two-dimensional web page to a form useable in the three-dimensional computing environment; and
presenting the converted web page in the 3D desktop to allow a first user of the first computer system to navigate content of the converted web page in a 3D manner, including displaying at least a portion of the content of the converted web page in a persistent client window of the 3D desktop that is persistent even if a connection between the first computer system and the Internet has been terminated.

2. The method of claim 1, further comprising:
the first user navigating the content displayed within the persistent client window in a 3D manner; and
communicating within the persistent client window with a second user who is navigating the same content from a second computer system over the Internet.

3. The method of claim 2, wherein communicating with the second user includes exchanging messages between the persistent client window of the first user of the first computer system with a persistent client window of the second user of the second computer system over the Internet.

4. The method of claim 3, further comprising the first user communicating with an avatar representing an owner of the content displayed within the persistent client window, including inquiring and/or acquiring an item displayed within the persistent client window.

5. The method of claim 1, wherein when the first computer system is offline, content displayed within the persistent client windows is buffered within the first computer system, and wherein in response an input from the first user within the persistent client window, a connection is automatically established between the first computer system and a server hosting the buffered content over the Internet to allow the first user continue to navigate the buffered content.

6. The method of claim 1, further comprising downloading a search engine and installing the search engine within the first computer system to allow the first user to search in the Internet within the 3D desktop without having to access a remote search facility.

7. The method of claim 6, further comprising displaying a search result in the 3D desktop, wherein the content displayed in the persistent client window is selected from the search result in response to an activation of the first user.

8. The method of claim 1, wherein a persistent client module associated with the persistent client window is configured to capture a navigation behavior of the first user and wherein information regarding the navigation behavior of the first user is sent to the server hosting the content displayed within the persistent client window to allow the hosting server to provide further information tailored to the navigation behavior of the first user.

9. A data processing system-readable medium having a plurality of instructions executable by a data processing system embodied therein, wherein said instructions when executed cause said data processing system to:
provide a three-dimensional (3D) computing environment representing a 3D desktop of a first computer system in a 3D environment, wherein one or more icons of the desktop are displayed on a plurality of surfaces of the 3D desktop;
receive a two-dimensional web page from a Web server over the Internet;
convert the two-dimensional web page to a form useable in the three-dimensional computing environment; and
present the converted web page in the 3D desktop to allow a first user of the first computer system to navigate content of the converted web page in a 3D manner, including displaying at least a portion of content of the converted web page in a persistent client window of the 3D desktop that is persistent even if a connection between the first computer system and the Internet has been terminated.

10. The data processing system-readable medium of claim 9, wherein the instructions further cause the data processing system to:
navigate the content displayed within the persistent client window in a 3D manner; and
communicate within the persistent client window with a second user who is navigating the same content from a second computer system over the Internet.

11. The data processing system-readable medium of claim 10, wherein communicating with the second user includes exchanging messages between the persistent client window of the first user of the first computer system with a persistent client window of the second user of the second computer system over the Internet.

12. The data processing system-readable medium of claim 11, wherein the instructions further cause the data processing system to have the first user communicating with an avatar representing an owner of the content displayed within the persistent client window, including inquiring and/or acquiring an item displayed within the persistent client window.

13. The data processing system-readable medium of claim 9, wherein when the first computer system is offline, content displayed within the persistent client windows is buffered within the first computer system, and wherein in response an input from the first user within the persistent client window, a connection is automatically established between the first computer system and a server hosting the buffered content over the Internet to allow the first user continue to navigate the buffered content.

14. The data processing system-readable medium of claim 9, wherein the instructions further cause the data processing system to download a search engine and installing the search engine within the first computer system to allow the first user to search in the Internet within the 3D desktop without having to access a remote search facility.

15. The data processing system-readable medium of claim 14, wherein the instructions further cause the data processing system to display a search result in the 3D desktop, wherein the content displayed in the persistent client window is selected from the search result in response to an activation of the first user.

16. The data processing system-readable medium of claim 9, wherein a persistent client module associated with the persistent client window is configured to capture a navigation behavior of the first user and wherein information regarding the navigation behavior of the first user is sent to the server hosting the content displayed within the persistent client window to allow the hosting server to provide further information tailored to the navigation behavior of the first user.

17. A data processing system, comprising
a processor;
a memory coupled to the processor for storing instructions, which when executed from the memory, cause the processor to perform a method, the method including
providing a three-dimensional (3D) computing environment representing a 3D desktop of a first computer system in a 3D environment, wherein one or more icons of the desktop are displayed on a plurality of surfaces of the 3D desktop;
receiving a two-dimensional web page from a Web server over the Internet; converting the two-dimensional web page to a form useable in the three-dimensional computing environment; and
presenting the converted web page in the 3D desktop to allow a first user of the first computer system to navigate content of the converted web page in a 3D manner, including displaying at least a portion of the content of the converted web page in a persistent client window of the 3D desktop that is persistent even if a connection between the first computer system and the Internet has been terminated.

18. The system of claim 17, wherein the method further comprises:

the first user navigating the content displayed within the persistent client window in a 3D manner; and communicating within the persistent client window with a second user who is navigating the same content from a second computer system over the Internet.

19. The system of claim 18, wherein communicating with the second user includes exchanging messages between the persistent client window of the first user of the first computer system with a persistent client window of the second user of the second computer system over the Internet.

20. The system of claim 19, wherein the method further comprises the first user communicating with an avatar representing an owner of the content displayed within the persistent client window, including inquiring and/or acquiring an item displayed within the persistent client window.

* * * * *